(12) United States Patent
Mullin et al.

(10) Patent No.: US 8,549,272 B2
(45) Date of Patent: Oct. 1, 2013

(54) INFORMATION HANDLING SYSTEM IMAGE MANAGEMENT DEPLOYMENT OF VIRTUAL MACHINE IMAGES TO PHYSICAL INFORMATION HANDLING SYSTEMS

(75) Inventors: John Mullin, Edinburgh (GB);
Campbell McNeill, Austin, TX (US);
Christopher Speers, Austin, TX (US);
Dana Ragsdill, Pflugerville, TX (US);
John Tracey, Edinburgh (GB);
Lawrence Smithmier, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 495 days.

(21) Appl. No.: 12/703,230

(22) Filed: Feb. 10, 2010

(65) Prior Publication Data

US 2011/0197051 A1    Aug. 11, 2011

(51) Int. Cl.
*G06F 15/177* (2006.01)
*G06F 9/00* (2006.01)

(52) U.S. Cl.
USPC ................ 713/1; 717/176; 718/1; 713/100

(58) Field of Classification Search
USPC ................ 713/1, 100; 717/176; 718/1
See application file for complete search history.

(56) References Cited

U.S. PATENT DOCUMENTS

| | | | |
|---|---|---|---|
| 7,356,679 B1 | 4/2008 | Le et al. | |
| 7,379,982 B2 | 5/2008 | Tabbara | |
| 7,426,052 B2 | 9/2008 | Cox et al. | |
| 2006/0184937 A1* | 8/2006 | Abels et al. | 718/1 |
| 2006/0277542 A1* | 12/2006 | Wipfel | 717/174 |
| 2008/0082976 A1* | 4/2008 | Steinwagner et al. | 718/1 |
| 2008/0307414 A1 | 12/2008 | Alpern et al. | |
| 2009/0083404 A1* | 3/2009 | Lenzmeier et al. | 709/221 |
| 2009/0216975 A1* | 8/2009 | Halperin et al. | 711/162 |
| 2009/0288082 A1* | 11/2009 | Nazeer et al. | 718/1 |
| 2009/0292737 A1* | 11/2009 | Hayton | 707/200 |
| 2009/0328030 A1* | 12/2009 | Fries | 717/174 |
| 2010/0115512 A1* | 5/2010 | Sakai | 718/1 |

* cited by examiner

*Primary Examiner* — Chun Cao
(74) *Attorney, Agent, or Firm* — Terrile, Cannatti, Chambers & Holland, LLP; Robert W. Holland

(57) ABSTRACT

Images for information handling system manufacture and maintenance are created and managed by manipulating the images as virtual machines through a secure remote network interface, such as a virtual private network or virtual desktop infrastructure. Operating system and application installation and updates, such as service packs and patches, are performed on a virtual machine of the image to adjust the image as desired, and then the image is transformed for loading on physical information handling systems, such as newly manufactured information handling systems or deployed information handling systems in need of maintenance.

20 Claims, 4 Drawing Sheets

INFORMATION HANDLING SYSTEM IMAGE MANAGEMENT DEPLOYMENT OF VIRTUAL MACHINE IMAGES TO PHYSICAL INFORMATION HANDLING SYSTEMS

BACKGROUND OF THE INVENTION

1. Field of the Invention

The present invention relates in general to the field of information handling system manufacture, and more particularly to a system and method for information handling system image management and deployment.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Enterprises and individuals have come to rely upon information handling systems for an ever-increasing number and diversity of tasks. Enterprises in particular face challenges in purchasing and maintaining information handling systems that are compatible with each other. The degree of challenge faced by enterprises tends to increase with the number of systems deployed since older systems are typically replaced gradually over time with newer systems that have updated hardware and software components. One technique used by enterprises to maintain compatible information handling systems is to maintain one or more images of an operating system and applications for use in the enterprise's information handling systems. Imaging is a technique that alleviates the time and effort associated with installing an operating system and set of applications on an information handling system by keeping a copy of the operating system and applications in an installed condition for copying to other information handling system hard disk drives. Conventional imaging uses a source information handling system that is configured with the operating system and applications to take a snapshot of the source system's hard disk drive or other permanent memory, such as a solid state drive. The image is essentially a copy of the source system's hard disk drive minus system-specific to the source, such as a system name or system-specific hardware drivers. The image is deployed to new information handling systems by copying the image to the new system and configuring the system for system-specific components.

Although imaging simplifies information handling system manufacture, a number of difficulties remain with the use of images by enterprises. One difficulty is that an image must typically be updated each time a hardware driver is updated or an operating system patch, hot fix or security update issues. One approach to addressing this difficulty is to host an image development environment at an information handling system manufacturer that an enterprise accesses to prepare and maintain images so that the manufacturer can keep the image updated. Alternatively, an enterprise can maintain a platform independent image within the enterprise's environment so that hardware components are maintained separately by a manufacturer of the information handling systems. A difficulty with these approaches is that a platform-independent image created in an enterprise environment does not readily transfer to an image maintained by a manufacturer in a manufacture environment that includes hardware-specific components. Other difficulties include a lack of real-time build and verification of an image, a slow build process such as where an image is built by installation of applications on a physical system, limited operating system support, limited usability for server information handling systems and maintenance of non-critical patches.

SUMMARY OF THE INVENTION

Therefore a need has arisen for a system and method which manages information handling system images efficiently for information handling system manufacturers and enterprises that use information handling systems.

In accordance with the present invention, a system and method are provided which substantially reduce the disadvantages and problems associated with previous methods and systems for managing information handling system images. An enterprise location remotely interfaces with a manufacture location to alter a virtual machine as an image to a form that suits manufacture of information handling systems for the enterprise. The altered virtual image is saved at the manufacture location and promoted as a production image for manufacture of physical information handling systems for the enterprise.

More specifically, information handling system images for manufacture or maintenance of information handling systems of an enterprise are remotely managed through secure network communications, such as a virtual private network or virtual desktop infrastructure. An enterprise location defines an image for the enterprise and saves the image at a manufacture location. For example, the image is defined as a maintenance image of an operating system and selected applications, a manifest of defined settings and a build engine that performs a build of an image when initiated at target hardware. The enterprise then initiates the image at the manufacture location as a virtual machine and alters the virtual machine through a remote interface much as the enterprise would interact with a physical information handling system having the image. Once the image of the virtual machine meets the enterprise's specifications, the virtual machine image is captured and converted to a physical information handling system format for promotion to a manufacture location for loading of the image to manufactured information handling systems.

The present invention provides a number of important technical advantages. One example of an important technical advantage is that imaging extends to a variety of operating systems with reduced developmental effort, such as Windows and Linux operating systems. Image build is quicker with fewer components installed during the build process. Enterprises can more easily apply non-critical patches, such as service packs, during the configuration process. Validation of an image takes less time and is less complex, such as by having the enterprise download the image, validate that the image is deployable and that all settings of the image are correct. In addition, a compatible off-line solution provides flexibility for enterprises to initially configure an image locally and then upload the image to a manufacturer who maintains the image through its life cycle as a virtual machine.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Remote management of information handling system images provides reduces development efforts and complexity in setting images for manufactured and maintained information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
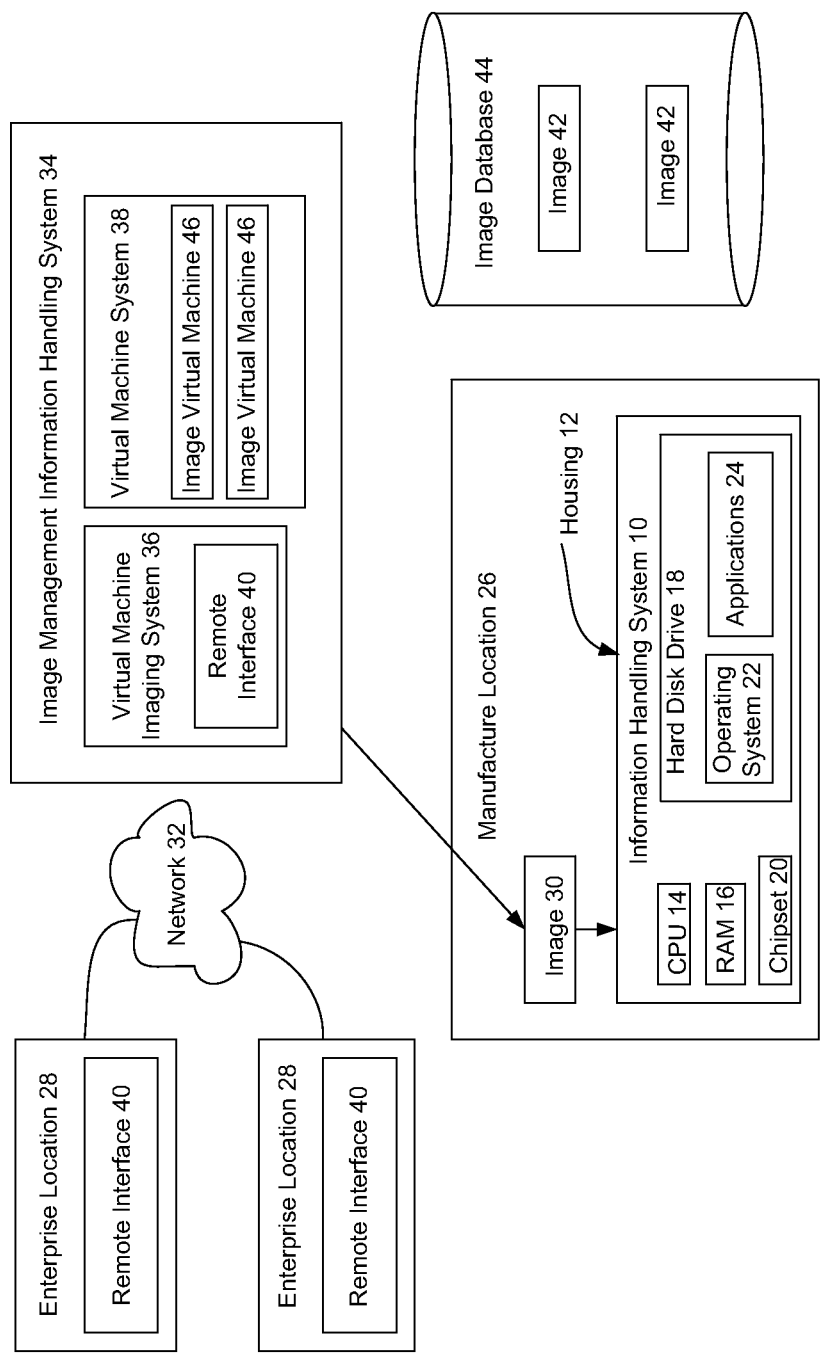
FIG. 1 depicts a block diagram of a system for remote management of information handling system images for manufacture of information handling systems.

Referring now to FIG. 1, a block diagram depicts a system for remote management of information handling system images for manufacture of information handling systems 10. Information handling systems 10 are physically manufactured by the assembly of components in a housing 12, such as a CPU 14, RAM 16, a hard disk drive 18 and chipset 20. CPU 14 executes instructions to process information, such as instructions of an operating system 22, like WINDOWS or LINUX, that coordinates operation of the components to support applications 24, like word processing or spreadsheet applications. Operating system 22 and applications 24 are stored in permanent storage of information handling system, such as hard disk drive 18, and booted to an operational state upon power up with firmware stored on chipset 20, such as a BIOS. Information handling systems 10 are built at a manufacture location 26 distal from enterprise locations 28 where the systems are ordered by enterprises for use to include an image 30 specific to each enterprise. Image 30 is a copy of operating system 22 and applications 24 configured for an enterprise so that information handling systems are delivered from manufacture location 26 to enterprise location 28 ready to boot to an operational state desired by the enterprise.

In order to manage images 30 for use by an enterprise, both in manufacture of new information handling systems and maintenance of existing information handling systems, an enterprise at an enterprise location 28 remotely interfaces through a network 32 to an image management information handling system 34 associated with manufacture location 26. For example, a virtual machine imaging system 36 associated with image management information handling system 34 provides access to a virtual machine system 38 through a remote interface 40. In one embodiment, remote interface 40 is a virtual private network or a virtual desktop infrastructure that provides a secure tunnel between enterprise location 28 and manufacture location 26 through the Internet. Virtual machine imaging system 36 allows inputs from enterprise location 28 to select an image 42 from an image database 44 and execute the image 42 as an image virtual machine 46 running on virtual machine system 38. Remote interface 40 allows inputs from enterprise location 28 to manipulate an image virtual machine 46 as though image virtual machine 46 were a physical information handling system loaded and running with the selected image 42. Inputs from enterprise location 28 alter image 42 as desired and save the altered image to image database 44. Virtual machine imaging system 36 then transforms the virtual machine image to an image adapted to execute on a physical information handling system and promotes the image to manufacture location 26 for manufacture of information handling systems with the image. Virtual machine imaging system 36 thus provides a network-based solution that enables an enterprise to configure a virtual image interactively using secure remote desktop technology, such as changing operating system settings and installing applications, with an experience that is similar to working on a local information handling system.

Figure 2:
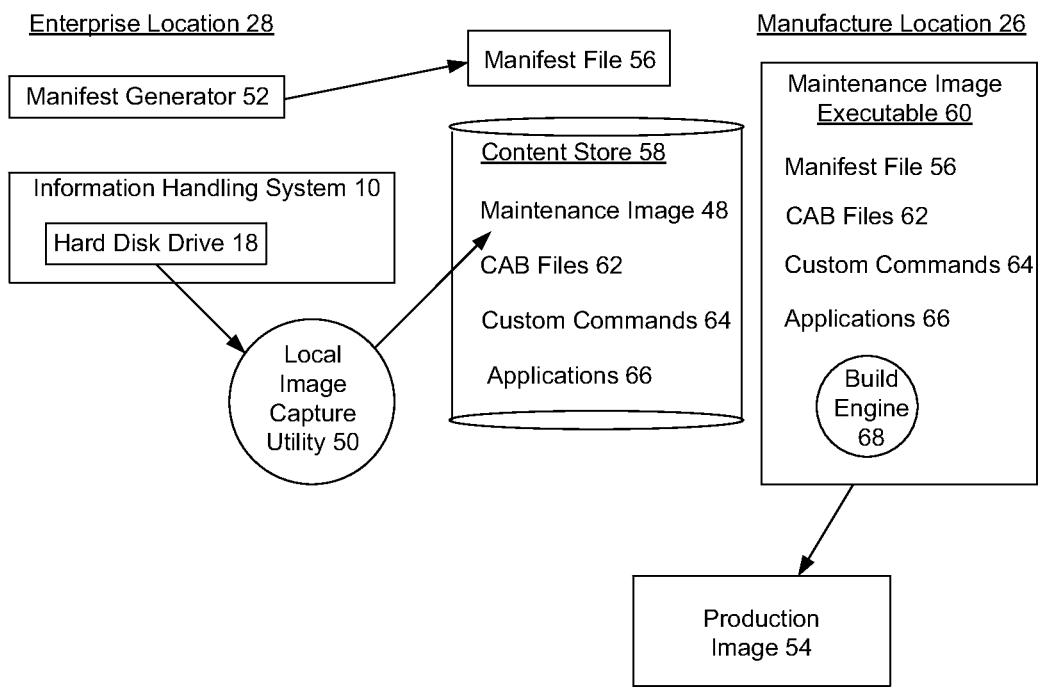
FIG. 2 depicts a block diagram of a system for defining an information handling system image as a virtual machine.

Referring now to FIG. 2, a block diagram depicts a system for defining an information handling system image as a virtual machine. An enterprise location 28 first defines a maintenance image 48 that represents a desired operating system customized for the enterprise's needs, such as customized by installation of applications or changing settings in the operating system. In one embodiment, the maintenance image is created on an information handling system 10 at enterprise location 28 and captured from a hard disk drive 18 of information handling system 10 with a local image capture utility 50, such as ImageX or Norton Ghost. Alternatively, a maintenance image stored at manufacture location 26 is selected by enterprise location 28 with a remote interface. Maintenance image 48 is not intended for deployment to physical information handling systems, but rather provides a base image that an enterprise maintains for future image creation activities. A manifest generator 52 executes at an enterprise location 28 to accept enterprises inputs for settings in a production image 54 built from maintenance image 48. For example, manifest generator 52 accepts selections for options that include licensing, regional settings, applets, power settings, networking settings and custom commands and saves the selections in an XML manifest file 56. Production image 54 is built by copying manifest file 56 and a maintenance image content store 58 to a maintenance image executable 60. Maintenance image content store 58 includes maintenance image 48 and deployment content, such as CAB files 62, custom commands 64 and applications 66. A build engine 68 is included with maintenance image executable 60. Build engine 68 is a task sequencer that coordinates activities that specialize production image 54 for target hardware. Maintenance image executable 60 is prepared for auto discovery on its next boot and then captured as a production image 54. Production image 54 is deployable at an enterprise for use on enterprise information handling systems, promoted to a manufacture location 26 for use on newly manufactured information handling systems, or stored at a manufacture location for subsequent interaction as a virtual image.

Maintenance image executable 60 may be created at enterprise location 28 through remote interaction with manufacture location 26. An enterprise uploads relevant items to manufacture location 26 for storage within maintenance image executable 60. Manifest generator 52 interacts with the maintenance image remotely to configure the image and then build a production image by loading the maintenance image 48, manifest file 56, build engine 68 and other content to a virtual machine for execution. An image of the configured virtual machine is captured and converted to a physical information handling system format for use as a production image 54. Thus, an enterprise may elect to build a maintenance image locally or remotely and use the maintenance image for creating a production image at an information handling system manufacturer location.

Figure 3:
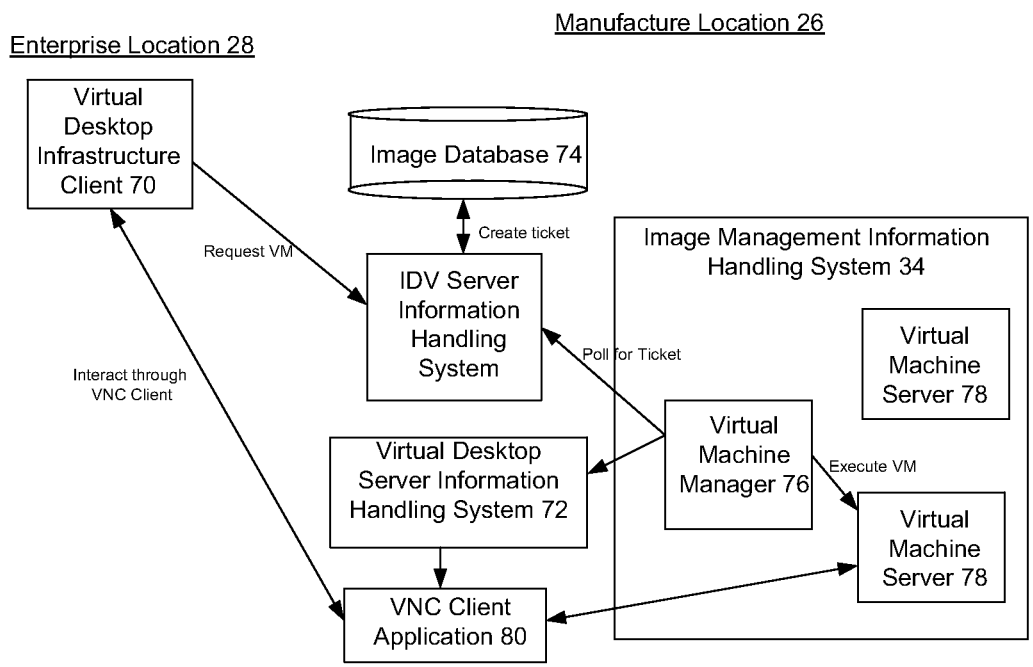
FIG. 3 depicts a block diagram of one example system that remotely manages information handling system images.

Referring now to FIG. 3, a block diagram depicts one example system that remotely manages information handling system images. In the example embodiment depicted by FIG. 3, a virtual desktop infrastructure provides an enterprise location 28 with access to virtual machine images at a manufacture location 26 to create and manage images for production of physical information handling systems at manufacture location 26. A virtual desktop infrastructure client 70 at enterprise location 28 allows an enterprise to configure a virtual machine to act as a physical information handling system image. A virtual machine image is created on an image management information handling system 34 from an image uploaded by the enterprise from enterprise location 28 or an image stored at manufacture location 26, such as a stock image from a library, a previously stored maintenance image, applications and other components selected by the enterprise or a previously stored manufacture image. Images imported or stored in a physical image format are converted to a virtual machine image format and are then manipulate to define a desired image through a secure mechanism, such as a Citrix XenApp Server 72 using a virtual desktop infrastructure and Independent Computing Architecture (ICA) protocol or a secure tunnel via an SSL gateway. The use of a virtual desktop infrastructure or virtual private network allows an enterprise location 28 to perform image alterations much as if the image were executing on a physical information handling system. For example, an enterprise location 28 executes operating system patches and service packs on a virtual machine at manufacture location 26, and can even put the virtual image on an automated patch update program. Once alterations to the virtual image are complete, a manifest file may be applied along with CAB files, custom commands applications and a build image and the final image captured as a production image.

In operation, enterprise location 28 interfaces with manufacture location 26 through interface 70 and requests a ticket to manage a virtual machine. A ticket is created in database 74 and a virtual machine manager information handling system 76 within image management information handling system 34 polls database 74 to search for outstanding tickets. When the ticket is located in database 74, virtual machine manager 76 launches a virtual machine associated with the ticket on a virtual machine server information handling system 78. A virtual machine is launched by attaching a virtual hard disk drive to the virtual machine and, if desired, mounting the enterprise's applications as an ISO. Virtual machine manager 76 requests virtual desktop infrastructure server 72 to start a VNC client application 80, such as based on .NET_VNC, an a VNC client application starts to allow interface 70 to interact with the virtual machine image. Interface 70 redirects to a new web page to load the ICA client, such as an applet, Silverlight application or ActiveX control, so that enterprise location 28 interacts with the virtual machine through VNC client application 80.

Figure 4:
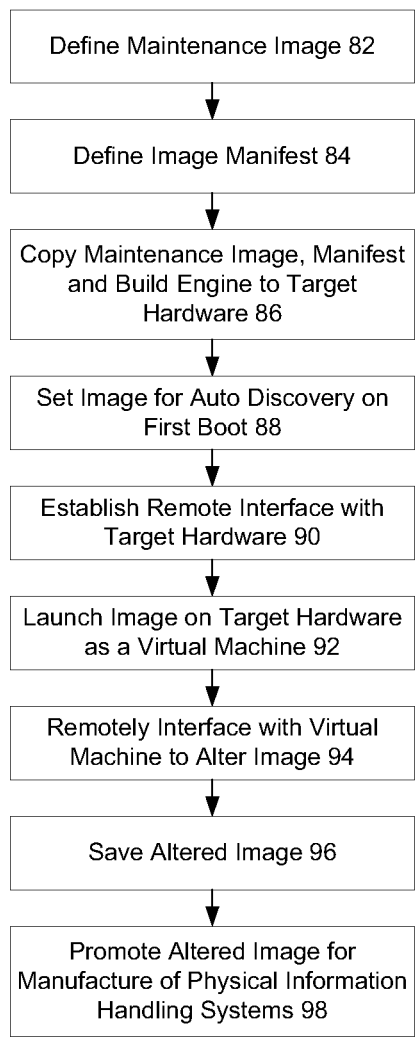
FIG. 4 depicts a flow diagram of a process for remotely managing information handling system images.

Referring now to FIG. 4, a flow diagram depicts a process for remotely managing information handling system images. The process begins at step 82 with the defining of a maintenance image having an operating system have desired configuration settings. At step 84, a manifest is defined for the maintenance image which specifies a variety of options for the production image that results from the process. The maintenance image and manifest may be defined locally and then transferred to the manufacture location or defined through a network interface at manufacture location information handling systems. At step 86, the maintenance image, manifest and a build engine along with other specifications are copied to target hardware, such as a virtual hard drive defined within a virtual machine executing on server information handling systems at a manufacture location. At step 88, the image saved at the target hardware is set for auto discovery on first boot.

Once an image is saved at a manufacture location, the process continues at step 90 by establishing a remote interface from the enterprise location to the target hardware at the manufacture location having the image. At step 92, the image is launched as a virtual machine on target hardware of the manufacture location and made accessible to the enterprise location through a virtual private network or virtual desktop infrastructure so the enterprise location can interact with the virtual machine as though remotely interacting with a physical information handling system. At step 94, the enterprise remotely interfaces with the virtual machine at the manufacture location to alter the virtual machine so that the virtual machine forms an image acceptable to the enterprise for manufacture of information handling systems. At step 96, the altered virtual machine image is transformed to a physical information handling system image and saved. At step 98, the altered image is promoted to a manufacture assembly line for loading on newly manufactured information handling systems that are then shipped to the enterprise location.

Although the present invention has been described in detail, it should be understood that various changes, substitutions and alterations can be made hereto without departing from the spirit and scope of the invention as defined by the appended claims.

What is claimed is:

1. A method for managing an information handling system image to manufacture physical information handling systems, the method comprising:

remotely interfacing from an enterprise location with a physical information handling system, the physical information handling system located at a manufacture location;

defining a virtual machine image on the physical information handling system, the virtual machine image having a maintenance image, a manifest and a build engine, the build engine including a task sequencer to coordinate activities that specialize a physical information handling system image for hardware of a physical information handling system;

launching the virtual machine image on the physical information handling system, the virtual machine image launched as a virtual machine;

remotely interfacing from the enterprise location with the virtual machine to alter the virtual machine image;

transforming the altered image to a physical information handling system image having at least an operating system operable to coordinate operation of physical components;

saving the altered image at the manufacture location; and promoting the altered image to manufacture physical information handling systems that run the altered image operating system to coordinate operation of physical components.

2. The method of claim 1 wherein remotely interfacing with the virtual machine to alter the image further comprises interfacing with the virtual machine through a virtual private network.

3. The method of claim 1 wherein remotely interfacing with the virtual machine further comprises interfacing with the virtual machine through a virtual desktop infrastructure.

4. The method of claim 1 wherein remotely interfacing with the virtual machine to alter the image further comprises loading an application on the virtual machine.

5. The method of claim 1 wherein remotely interfacing with the virtual machine to alter the image further comprises loading an operating system patch on the virtual machine.

6. The method of claim 1 wherein remotely interfacing with the virtual machine to alter the image further comprises performing an update on an application already loaded on the virtual machine.

7. The method of claim 1 wherein saving the altered image further comprises capturing the virtual machine as a physical image loadable on a permanent storage device, the method further comprising:

building a physical information handling system from plural components; and copying the physical image on the physical information handling system.

8. The method of claim 1 wherein defining an image on the physical information handling system further comprises:

defining a maintenance image having an operating system with one or more customized settings;

defining a manifest having one or more image customizations;

copying the maintenance image, manifest and a build engine to a target hardware; and setting the image for auto discovery on the next boot.

9. The method of claim 8 wherein the operating system customized settings comprise an application installed to run over the operating system.

10. The method of claim 8 wherein the manifest image customizations comprise power settings.

11. A system for managing an information handling system image for use in manufacture of physical information handling systems, the system comprising:

an information handling system operable to process information;

a remote interface associated with the information handling system and operable to support communications with a remote device through a network;

a virtual machine system executing on the information handling system and operable to support operation of one or more virtual machines on the information handling system;

an information handling system image for manufacture of information handling systems stored in memory associated with the information handling system to run as a virtual machine; and a virtual machine imaging system operable to alter the information handling system image as a virtual machine running on the virtual machine system in response to the remote device to define a physical information handling system image for use in manufacture of physical information handling systems, the information handling system image transformed so that an operating system of the information handling system image will coordinate operations of physical components of a manufactured physical information handling system, the virtual machine imaging system including a build image with the transformed information handling system image, the build engine including a task sequencer to coordinate activities that specialize a physical information handling system image for hardware of a physical information handling system.

12. The system of claim 11 wherein the virtual machine imaging system is further operable to promote the information handling system image to a physical information handling system for manufacture of the physical information handling system having the image copied in permanent storage of the physical information handling system.

13. The system of claim 11 wherein the remote interface comprises a virtual private network.

14. The system of claim 11 wherein the remote interface comprises a virtual desktop infrastructure.

15. The system of claim 11 wherein the virtual machine imaging system alters the virtual machine by loading an application on the virtual machine.

16. The system of 11 wherein the virtual machine imaging system alters the virtual machine by executing an operating system update on the virtual machine.

17. The system of claim 11 further comprising a configurator operable to define the information handling system image by:

defining a maintenance image having an operating system with one or more customized settings;

defining a manifest having one or more image customizations;

copying the maintenance image, manifest and a build engine to a target hardware; and setting the image for auto discovery on the next boot.

18. The system of claim 17 wherein the manifest image customizations comprise power settings.

19. The system of claim 17 wherein the manifest image customizations comprise network settings.

20. The system of claim 17 wherein the target hardware comprises a virtual machine executing on an information handling system.

* * * * *